(12) United States Patent
Endoh

(10) Patent No.: US 7,477,675 B2
(45) Date of Patent: Jan. 13, 2009

(54) DATA COMMUNICATION APPARATUS

(75) Inventor: Takashi Endoh, Yamato (JP)

(73) Assignee: Kyocera Corporation, Kyoto (JP)

( * ) Notice: Subject to any disclaimer, the term of this patent is extended or adjusted under 35 U.S.C. 154(b) by 660 days.

(21) Appl. No.: 11/238,175

(22) Filed: Sep. 28, 2005

(65) Prior Publication Data

US 2006/0067222 A1   Mar. 30, 2006

(30) Foreign Application Priority Data

Sep. 30, 2004   (JP) .............................. 2004-286766
Sep. 30, 2004   (JP) .............................. 2004-286767

(51) Int. Cl.
*H04L 12/26* (2006.01)
(52) U.S. Cl. ...................... 372/252; 370/235
(58) Field of Classification Search ......... 370/229–235, 370/252; 714/16–18
See application file for complete search history.

(56) References Cited

U.S. PATENT DOCUMENTS 6,922,557 B2 * 7/2005 Fantaske ..................... 455/403
2004/0228273 A1 * 11/2004 Kurobe et al. ............... 370/229
2008/0081635 A1 * 4/2008 Jonnson ..................... 455/452.2

FOREIGN PATENT DOCUMENTS

JP    07-067088    3/1995

* cited by examiner

*Primary Examiner*—Chi H. Pham
*Assistant Examiner*—Thai D. Hoang
(74) *Attorney, Agent, or Firm*—Hogan & Hartson LLP

(57) ABSTRACT

When data has been received by a sending and reception unit, a transmission control unit generates an ACK and outputs it to an ACK reduction unit. A reception interval measuring unit detects a time interval in the data which is received, and starts ACK reduction process by the ACK reduction unit if this time interval is greater than or equals to a first predetermined value. In this case, the ACK reduction unit reduces the number of ACKs which are transmitted via the sending and reception unit. An ACK interval measuring unit detects a time interval of generating ACKs by the transmission control unit, and stops the ACK reduction process by the ACK reduction unit if this time interval is greater than or equals to a second predetermined value.

6 Claims, 10 Drawing Sheets

DATA COMMUNICATION APPARATUS

BACKGROUND OF THE INVENTION

1. Field of the Invention

The present invention relates to a data communication apparatus including a transmission control unit which executes a transport layer protocol when performing communication via a packet exchange network, and, in particular, relates to a data communication apparatus which makes it possible to anticipate improvement of the load during communication via a communication path which includes a communication channel involving occasion of temporary delay and transmission of burst-like packets.

Furthermore, the present invention relates to a data communication apparatus which creates a data link which performs retransmission control according to an automatic repeat request (ARQ) algorithm, and in particular relates to a data communication apparatus, with which it is possible to anticipate improvement of throughput.

Priority is claimed on Japanese Patent Application No. 2004-286766, filed Sep. 30, 2004 and Japanese Patent Application No. 2004-286767, filed Sep. 30, 2004 the content of which are incorporated herein by reference.

2. Description of Related Art

In the prior art, TCP (Transmission Control Protocol) is widely known as a transport layer protocol which guarantees reliability during internet communication. TCP is documented in RFC793, RFC1122, RFC2581, RFC2582 and so on, but research is continuing in order to develop improvements. TCP is positioned upon the transport layer in the OSI reference model, and performs control of connection, implementation of stream type communication, control of quality such as error control and flow control and the like, communication with ports designated by port number, and congestion control (a technique which controls communication so that there is no occurrence of a state of congestion in which it becomes impossible to perform effective communication due to increase of traffic upon the network).

In communication based upon TCP, the data which is to be transmitted is divided into small portions of data which is called segments, and these segments are included in and are transmitted in IP (Internet Protocol) packets. When the reception side receives these IP packets, it extracts the segments based upon TCP, and reconstructs the original data by linking them in the appropriate order.

IP is positioned upon the network layer, and regulates communication between hosts which are designated by IP addresses. A TCP connection is established between two ports which are designated by port number, in addition to IP address. Due to this, even if multiple applications are using the communication path at the same time, it is possible to discriminate between them by differences in their port numbers.

Error control in TCP is implemented by ACKs (ACKnowledge: check responses and acknowledgement responses), and ACKs are transmitted from the reception side to the transmission side, with the transmission side retransmitting any data segment for which an ACK is not returned. Furthermore, the transmission side is arranged to transmit data segments of a certain window size, based upon TCP, in order to increase throughput. This method is called sliding window flow control: transmission of a data segment of the window size is permitted, and, when an ACK for this data segment is returned from the reception side, the sequence number of the window is slid. The window upon the transmission side is called the congestion window (cwnd: congestion window), and it also serves for congestion control.

TCP flow control is also performed by notifying a receiver window (rwnd) within the ACKs which are returned from the reception side to the transmission side. This rwnd indicates the amount of data which can be received by the reception side, and, if zero is notified as rwnd, then it is possible to stop transmission. Rwnd is determined depending upon the buffer amount which is provided upon the reception side. The transmission side restricts transmission so as not to exceed the smaller value between rwnd and cwnd.

The objective of such sliding window flow control is, by performing retransmission control with ARQs (Automatic Repeat Requests), along with preventing a state of affairs in which the buffer upon the reception side is insufficient, to enhance throughput. Since communication upon the internet is performed via multiple data links, it is necessary to perform flow control upon the transport layer, without depending upon any specified data link layer.

In the following, the congestion control in TCP will be explained. During congestion control in TCP, slow starting and congestion avoidance action are performed in order to prevent collapse of the network due to congestion. During slow starting, cwnd is set to be small at the start of transmission, and cwnd is increased with exponential growth each time an ACK is returned from the reception side. For example, cwnd may be increased by 1, every time one ACK is returned.

That is to say, it becomes possible to transmit two data segments for a single ACK. Congestion avoidance is the action of increasing cwnd little by little. During such congestion avoidance, cwnd is increased by 1/cwnd every time that a single ACK is returned. In other words, when a number of ACKs equal to cwnd which have been returned, for the present cwnd, cwnd+1 becomes the next value of cwnd. By contrast to flow control which is based on a consideration for the reception side, congestion control is based on a consideration for the network.

Due to the fact that wireless data communication is becoming popular, there is a steady increase of application configurations in which a wireless communication channel is included upon the communication path.

On a high speed wireless communication channel, it sometimes happens that, when a temporary delay occurs, it is accompanied by transmission of packets in a burst-like manner. Upon the data link layer and the physical layer of a wireless communication channel, the reliability is increased by executing a protocol based upon automatic repeat request (ARQ) algorithm. When some receiving terminal which is upon the wireless communication channel detects an error in data which has been received, the receiving terminal requests the transmission side to retransmit that data and stores the data in a temporary buffer during the time interval until the requested data arrives, therefore, this causes delay.

The base station which is the transmission side of the wireless communication channel keeps the data, against the possibility of retransmission, until the receiving terminal returns a reception check response (an ACK). Since it sometimes happens that the quality deteriorates temporarily upon a wireless communication channel, the base station performs adjustment, by changing the modulation method and the data transmission speed in order to prevent too poor error ratio. Even with this, the error ratio upon the wireless communication channel is great as compared with a wire communication channel, therefore, it becomes necessary to perform retransmission control upon a wireless communication channel.

TCP is provided with a so called Delayed ACK mechanism. Delayed ACK is described in RFC1122 and RFC813. With Delayed ACK, the transmission of ACKs is delayed, therefore, an ACK is transmitted when the next ACK is generated, or when there is a timeout, or when a transmitted data segment is generated. If, in the state in which an ACK is delayed, the next ACK is generated, then the ACKs which are transmitted are reduced in the proportion of two to one; and, further, if a data segment is generated, the number of ACKs to be transmitted is reduced by combining ACKs and the data segment.

This Delayed ACK operation has the merit that the number of ACKs is reduced when executing a Telnet application, but it has no particular merit when downloading a large volume of data, on the contrary, it has the demerit that it causes fluctuations in the RTT (Round Trip Time: delay). Furthermore, if the Delayed ACK method is extended and the delay in transmission of ACKs is made large, therefore, the reduction ratio in the number of ACKs becomes great, then, in correspondence thereto, the data segments which are transmitted from the transmission side become burst-like, and it becomes easy for congestion to be generated upon the forward link (going downward).

It should be understood that the following type of concept is per se known as a technique for reduction of ACKs. For an asymmetrical communication path in which the transmission speed of the forward link is high and the transmission speed of the reverse link (upwards) is low, a router is known which, when congestion is taking place upon the reverse link communication path, performs reduction of the number of ACKs by discarding the oldest ACK packet which has already been enqueued in the waiting queue and enqueuing the latest ACK packet in the waiting queue, based upon the buffer management principle of dropping from the head end of the buffer (so called "drop-from-front buffer discipline"). Due to that, in an asymmetrical communication path, congestion can easily take place on the reverse link which has low transmission speed, this apparatus is set up to discard, among the ACK packets which remain within the router and cannot be transmitted, that ACK packet which is the oldest, for which the negative influence of its being discarded is very low.

In the prior art, if the data which has been requested is not retransmitted even though the wireless terminal transmits a repeat request ARQ to the data transmission side, a delay is inserted which is determined by the communication protocol of the wireless communication channel. Although the wireless terminal does wait for a retransmission for some predetermined time period, if this retransmission has expired, the wireless terminal considers that this data has been lost, and outputs the data which is received while waiting for retransmission of this data and that is saved in the buffer to downstream. The bandwidth of the forward link of a wireless communication channel currently attains several hundred kbps, and in the near future it is considered that it will be expanded further. Due to this, after the temporary delay generated in the wireless communication channel, the data packets come to be transmitted in a burst-like manner.

The data communication apparatus which is at the downstream and at which this type of burst-like data segments have arrived, transmits ACK packets based upon TCP in a burst-like manner. However, if part of the data segments is lost, the sequence numbers for the ACKs do not increase. These ACKs are recognized as duplicated ACKs if they have arrived at the transmission side before the TCP retransmission timeout, and a fast transmit algorithm is executed by the transmission side, however, if a retransmission timeout occurs, the transmission side performs retransmission of the data without waiting for an ACK to arrive, based upon TCP.

The situation with the above described communication is shown in FIG. 12. FIG. 12 is a time sequence graph showing the operation of well known prior art type of TCP NewReno (RFC2582) upon the reception side, and, in this figure, time is shown along the horizontal axis, while the sequence numbers are shown along the vertical axis. Here, although a normal time sequence graph is one which is measured at the transmission side, FIG. 12 shows the situation at the reception side. It is supposed that, at the reception side, there exist a wireless terminal which is connected to a wireless transmission channel, and a data communication apparatus on the downstream side which performs input and output of data with this wireless terminal. In FIG. 12, the reception of data segments 30 and the transmission of ACKs 31 for them are plotted. In a section 32, when the data communication apparatus receives a data segment 30 via the wireless terminal, both of the marks are plotted almost over one another, since the data communication apparatus transmits the corresponding ACK 31 directly after only a slight delay.

Although in the section 32 the data segments 30 arrive at the downstream data communication apparatus in a satisfactory manner, a large delay occurs in the section 33. During this interval the wireless terminal waits for the data to be retransmitted, and, moreover, during this interval, the wireless terminal receives the following data as well, and stores the data. When, upon the wireless communication channel, a timeout occurs on the data which was not retransmitted even though the ARQ-message was issued, since the wireless terminal transmits the data which has been accumulated to downstream, as shown in the section 34, a large volume of data segments 30 arrive at the downstream data communication apparatus in a short period of time, and a large volume of ACKs 31 are transmitted in response thereto. However, since a portion of the data segments 30 does not arrive, the sequence numbers of the ACKs are the same and constant, therefore, a large volume of duplicated ACKs are transmitted.

On the transmission side, if duplicated ACKs are detected based upon TCP, or if a retransmission timer has expired, then retransmission of a data segment is performed, and in the section 35 it is shown that this has arrived at the wireless terminal and the downstream data communication apparatus. Since the ACK for the data segment which has been retransmitted contains the sequence number of the data segment which ought to arrive next, accordingly, as shown in the section 35, the ACK number increases. Subsequently, as shown in the section 36, communication recovers in a satisfactory manner.

Since the bandwidth of the wireless communication channel is comparatively narrow, in many cases, a bottleneck occurs in the communication path. Therefore, due to above described type of burst-like ACK packets, communication load increases upon the reverse link of the wireless communication channel. It often happens that only about 1/10th of the bandwidth of the forward link of the wireless communication channel is provided for the bandwidth of its reverse link, therefore, such ACK packets which have been generated in a burst-like manner come to be stored in a transmission queue in the wireless terminal. It should be understood that a line interface device according to TCP/IP is described in Japanese Unexamined Patent Application, First Publication No. H07-67088.

However, since such a temporary large delay in a data packet and the following generation of ACK packets in a burst-like manner typically takes place when the quality of the wireless communication channel has deteriorated, it often happens that the bandwidth at this time upon the reverse link becomes smaller than at normal times, therefore, a problem arises that it takes a long time period before all of burst-like ACKs which have been stored in the transmission queue of the wireless terminal are transmitted. In such a case, a problem also arises that a large time interval becomes necessary for other packets to be transmitted through the reverse link. Furthermore, a problem also arises that there is a possibility that the transmission queue in the wireless terminal may overflow, therefore, an ACK packet or some other packet may be lost.

The present invention has been conceived in the light of the above described problems, and it takes as its objective to provide a data communication apparatus, which can prevent the generation of ACKs in a burst-like manner, and can decrease the transmission load upon the reverse link.

Moreover, in the prior art, along with usage of wireless terminals such as cellular phones or the like, wireless data communication means have become widely spread in which the transmission speed is an average of 600 kbps and is a maximum of 2.4 Mbps. Communication at high reliability is performed upon the wireless communication channel between the base station and the wireless terminal by performing retransmission control, using automatic repeat requests (ARQ). On the other hand, the time period from when the repeat request is issued to when the data is retransmitted constitutes a delay time, and meanwhile data in which no error has occurred arrives at the reception device of the wireless terminal one after another and is stored in the memory. The higher the transmission speed becomes, the greater the amount of data which is temporarily delayed in this manner becomes. For example, if communication at a transmission speed of 600 kbps has been delayed for 500 ms, 37,500 bytes of data comes to be temporarily stored.

The data which has been received with no errors should wait for the arrival of data to be retransmitted according to a transmission control protocol. In TCP, the data is divided into segments, and is transmitted with a sequence number appended to each segment. If the segments are received in a manner such as the sequence numbers are mixed-up, although it is possible to perform reordering upon the reception side, however, the permitted amount for this is normally three segments, and moreover there are also some implementations of TCP which have no capability for such reordering.

In error control for TCP, ACKs (ACKnowledgement: affirmative response; check response) are used: ACKs are transmitted from the reception side upon which data is received to the transmission side, and the transmission side retransmits data for which no ACK is returned. If, upon the reception side, the amount of data which has been received and for which the sequence numbers are mixed up exceeds the maximum amount which can be reordered, the reception side detects that segment loss has occurred, and returns an ACK without increasing the sequence number for the ACK. If the transmission side has received three duplicated ACKs (ACKs for which the ACK numbers duplicate), then fast transmit algorithm of the data starts.

It is considered that the reason why the permissible maximum amount for reordering upon the reception side of TCP is small in this way upon a cable data link such as one according to IEEE802.3 or the like is that the error ratio is low, and moreover it rarely happens that the order of the packets which are received is mixed up, therefore, if the sequence numbers of the data segments were not found, it can be taken that segment loss has been occurred almost every time. Here a data communication apparatus is assumed which, along with performing communication with an external device via a network which includes a wireless communication channel, also outputs data which has been received from an external device to another device downstream. If the data communication apparatus outputs to downstream data even when the sequence numbers of the segments are mixed up, based upon the above described type of TCP, retransmission of the data is performed based upon TCP, and this causes a deterioration of the throughput. Therefore, the throughput of TCP is enhanced if the data which has been received normally is temporarily delayed by the data communication apparatus upon the reception side of the wireless communication channel while waiting for the arrival of the data for which ARQ has been requested so as to keep the order of the sequence numbers of the segments.

However it also may happen that, even though ARQ has been made, the data which has been requested does not arrive, so that the ARQ times out. At this time, the data which has been temporarily stored in the data communication apparatus upon the reception side and in which no error has been included is output all at once to another device, so that the so called delay spike phenomenon occurred. This delay spike phenomenon causes TCP spurious timeouts. A spurious timeout is a phenomenon in which, when an intermediate data link such as a wireless communication channel experiences a long delay, the transmission side of TCP generates a retransmission timeout (RTO), and, since a large number of data segments arrive in a spike manner at the downstream device, a large number of ACKs are generated, and the transmission side performs a large number of useless data retransmission in response to these ACKs. In order to suppress such useless retransmission during such spurious timeouts, it is known that it is effective to utilize the Eifel algorithm.

If the delay spike phenomenon has occurred, due to this, the speed of data which is flowing to downstream of the data communication apparatus increases, and, although it is possible to anticipate the beneficial effect of avoiding deterioration of the throughput, it may cause congestion (a situation in which it becomes impossible to perform effective communication, due to the fact that the traffic upon the network has increased) upon the downlink which is upon downstream of the data communication apparatus. In the following, this will be explained with reference to FIG. 17. FIG. 17 is a time sequence graph showing the data reception situation during a delay spike, when a prior art type data communication apparatus is used. Although, normally, a time sequence graph shows the situation upon the transmission side of TCP, in this case, FIG. 17 shows the situation upon the reception side.

In FIG. 17, time is shown along the horizontal axis, and the sequence numbers of the segments are shown along the vertical axis. The circular symbols denote segments which have arrived at a device downstream of the data communication apparatus, while the vertically oriented quadrilaterals denote the occurrence of ACKs which are transmitted to the transmission side, and the X symbols denote losses. The reception up to the segment 40 proceeds satisfactorily, and the ACKs are transmitted almost simultaneously with the arrival of the data. The ACK corresponding to the segment 40 is the ACK 41. Due to the generation of an ARQ message for the wireless communication channel, the arrival of the segment after the segment 40 is delayed, and subsequently reception is not detected during the 500 ms until the repeat request times out. With a prior art data communication apparatus, after the ARQ message expires, the data which has been delayed and temporarily stored in a RAM (Random Access Memory) is output to the downstream side all together. Due to this, a delay spike is generated. The sharp rise after the segment 42 of FIG. 17 is such a delay spike. The downstream device which has received these segments generates a large number of ACKs (the ACKs after the ACK 43) based upon TCP, and transmits them to the transmission side of the segment. However, since one segment is lost, the sequence numbers of the ACKs in TCP do not increase, so that duplication of the ACKs occurs.

At the tail end of the delay spike, congestion occurs upon the downlink which is upon the downstream of the prior art data communication apparatus, and this is denoted by the lost segment 44 and the following X symbols. Upon the transmission side, the segment whose loss has been notified by a retransmission timeout (RTO), or by duplicated ACKs, is retransmitted based upon TCP. In FIG. 17, the segment which has been retransmitted is received by the data communication apparatus without being influenced from congestion, and is output to the downstream device. The segment which is received by the downstream device is denoted as the segment 46.

An ACK 47 is transmitted for the segment 46. This ACK 47 indicates that, due to congestion, the segment has not arrived. An operation of transmitting a segment indicated by an ACK is possible with so called NewReno or SACK (Selective ACK) TCP. The segment which has been lost due to congestion is notified to the transmission side by the sequence number of the ACK 47, and the transmission side retransmits the segment. Subsequently, the normal transmission mode is recovered.

Furthermore, even if congestion has not occurred upon the downlink at the downstream, it may happen that congestion occurs upon the uplink, due to the reception side generating ACKs in a burst-like manner based upon TCP.

In the following, this will be explained with reference to FIG. 18. Communication proceeds satisfactorily until the segment 50 is received by the device downstream of the data communication apparatus, and the ACK 51 for it is transmitted to the transmission side. After the segment 52 has been delayed upon the wireless communication channel, in the same manner as in FIG. 17, a large number of segments are output to the device upon the downstream side, and the delay spike phenomenon occurs.

Due to the fact that the segment 52 has not been lost, the sequence number of the ACKs suddenly increases, and ACKs are transmitted in a burst-like manner. This situation seems to be close to the spurious timeout phenomenon, however, it is assumed that a retransmission timer does not expire.

The ACK for the segment 54 is lost due to congestion upon the uplink. Due to this, the segment 56 is retransmitted upon the transmission side after a retransmission timeout (RTO) has expired based upon TCP. However the throughput is greatly reduced, since a long time period is required until this retransmission timeout (RTO) expires and moreover after this a slow start is executed.

A slow start is when the transmission side performs transmission by setting the amount of data which can be transmitted all at once (the congestion window: cwnd) to a small value. Furthermore, there is also a possibility that, although congestion such as in FIG. 18 has not occurred upon the uplink, burst-like ACKs arrive at the transmission side, and then burst-like transmission is caused, so that congestion is caused upon the downlink upstream of the data communication apparatus.

It should be understood that a line interface device according to TCP/IP is described in Japanese Patent Publication No. H7-67088.

When congestion upon the downlink such as described above occurs, there is the problem that the throughput deteriorates, due to segment retransmission based upon TCP and the narrowing down of the congestion window. Furthermore when congestion occurs upon the uplink, due to loss of the ACK packets, there is the problem that great deterioration of the throughput occurs due to retransmission timeout (RTO) upon the transmission side with TCP, narrowing down of the congestion window (cwnd), and slow starting. It should be understood that, according to the Eifel algorithm described above, unnecessary segment retransmission due to TCP is suppressed when spurious timeouts occurs, but the problem has not been solved that the throughput deteriorates due to that the delay spike phenomenon itself causes the problem of throughput slowdown.

The present invention has also been conceived in the light of the further problems described above, and it takes as another of its objectives to provide a data communication apparatus, which can avoid occurrence of congestion and avoid deterioration of the throughput, even if the delay spike phenomenon has occurred.

SUMMARY OF THE INVENTION

The first aspect of the present invention is a data communication apparatus, including: a sending and receiving unit which sends and receives data; a transmission control unit which generates acknowledge response information corresponding to data which has been received by the sending and receiving unit, and outputs the acknowledge response information via the sending and receiving unit; a first detection unit which detects a reception interval in the data which is received by the sending and receiving unit; a second detection unit which detects interval of generation of the acknowledge response information generated by the transmission control unit; and a reduction unit which, if the reception interval detected by the first detection unit exceeds a predetermined interval, reduces the acknowledge response information generated by the transmission control unit, until the interval which is detected by the second detection unit exceeds a predetermined interval.

The second aspect of the present invention is a data communication apparatus according to the first aspect, wherein, if the reception interval detected by the first detection unit exceeds the predetermined interval, the reduction unit reduces the acknowledge response information by storing only the latest acknowledge response information generated by the transmission control unit.

The third aspect of the present invention is a data communication apparatus according to the first aspect, further including: a duplicate detection unit which detects duplicate of identification information of the acknowledge response information generated by the transmission control unit; wherein, the reduction unit reduces the acknowledge response information after a predetermined number of duplicates which have been detected by the duplicate detection unit.

The fourth aspect of the present invention is a data communication apparatus, including: a sending and receiving unit which performs data sending and reception; a repeat request unit which performs detection related to errors of data received by the sending and receiving unit, and which requests repeat of the data if it has detected an error; a storage unit which stores data in which there are no errors and which is received before receiving the data for which the repeat request has been made is received; and a control unit which outputs the data which is stored in the storage unit at a predetermined rate, if the data for which the repeat request has been made is not received within a predetermined time interval.

The fifth aspect of the present invention is a data communication apparatus according the fourth aspect, a congestion detection unit which detects congestion based upon data received by the sending and receiving unit; wherein, the control unit reduces the predetermined rate if the congestion detection unit has detected congestion.

The sixth aspect of the present invention is a data communication apparatus according to the fourth aspect, a congestion detection unit which detects congestion based upon data sent by the sending and receiving unit; wherein, the control unit reduces the predetermined rate if the congestion detection unit has detected congestion.

DETAILED DESCRIPTION OF THE INVENTION

Various preferred embodiments of the present invention will now be explained with reference to the drawings.

The First Embodiment

Figure 1:
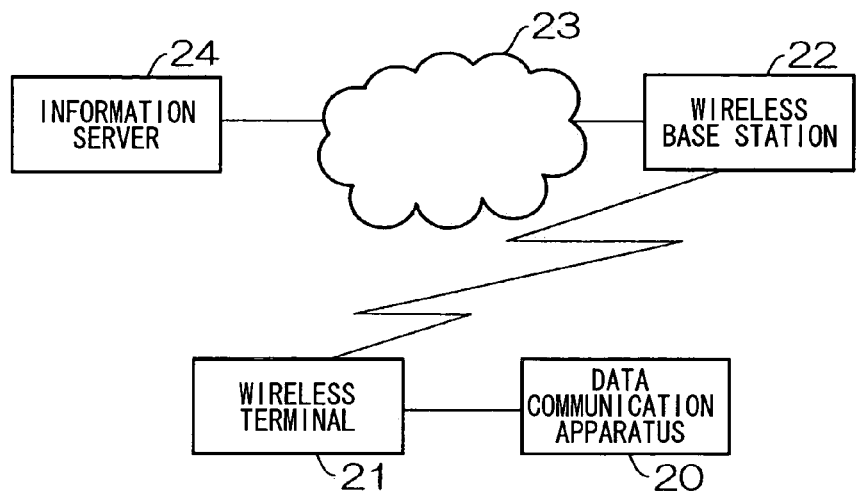
FIG. 1 is a block diagram showing the structure of a communication system which incorporates a data communication system according to the first embodiment of the present invention.

FIG. 1 is a block diagram showing the structure of a data communication system according to the first embodiment of the present invention. The various structures in this figure will be explained in the following. This data communication apparatus according to the first embodiment and a wireless terminal 21 are connected together by a LAN (Local Area Network) which is specified according to the IEEE802.3 standard.

This wireless terminal 21 constitutes a default gateway for the data communication apparatus 20. The first half of the following description relates to the communication apparatus 20, and the latter half relates to the wireless terminal 21. Furthermore, the wireless terminal 21 constitutes a data link to a wireless base station 22 via a wireless communication channel. In order to implement communication via this data link which is reliable and has a low error rate, a data link layer protocol (RLP: Radio Link Protocol) is executed which performs ARQs (automatic repeat requests). IP packets are carried over this data link. The wireless base station 22 is connected to the internet 23.

And an information server 24 (an external device) which is connected to the internet 23 acts as a http (Hyper Text Transfer Protocol) or a ftp (File Transfer Protocol) server, and provides information according to a request from the data communication apparatus 20. It should be understood that, although TCP is executed by the information server as well, it does not need to be endowed with the same functions as those of the data communication apparatus 20, and it will be sufficient for it to employ the functions of an OS (Operating System) which is in general use. Of course, it would also be acceptable for the information server 24 to be endowed with the functions of the data communication apparatus 20.

Figure 2:
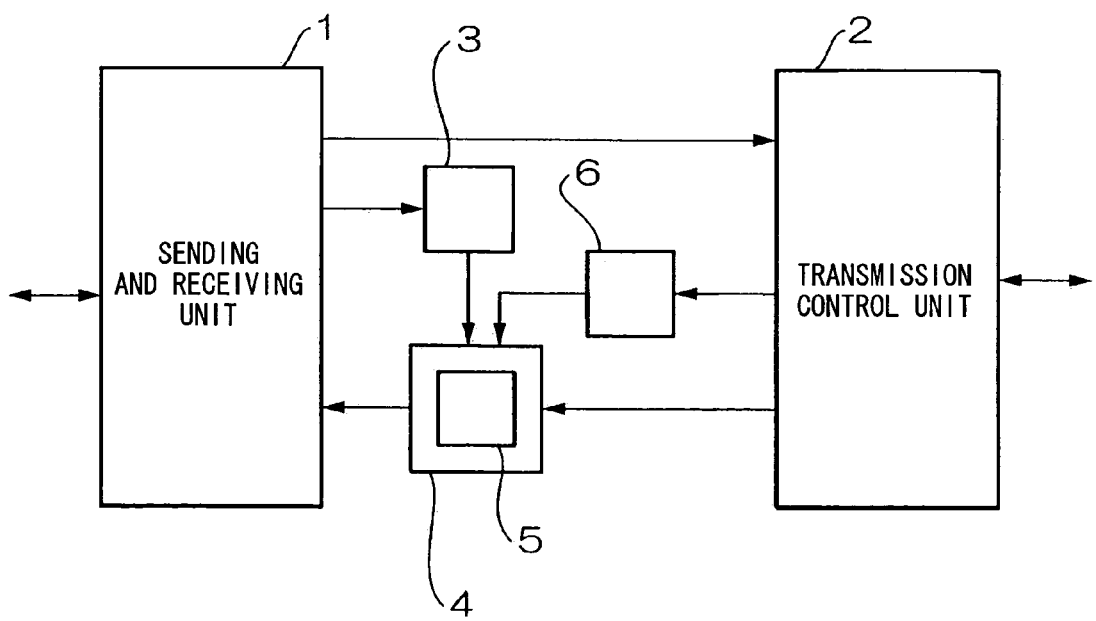
FIG. 2 is a block diagram showing the functional structure of this data communication apparatus according to this first preferred embodiment of the present invention.

FIG. 2 is a block diagram showing the functional structure of the data communication apparatus 20 according to the first embodiment of the present invention. In the following, the various structural elements in this figure will be explained. A sending and receiving unit 1 consists of hardware and software which, along with using a physical layer/data link layer as specified by IEEE802.3, also uses IP upon the network layer to implement communication via the packet exchange network. This sending and receiving unit 1, along with performing sending and reception of packets to and from other communication devices upon the communication channel, also extracts IP packets from these packets and processes them.

If an IP packet is one related to the sending and receiving unit 1 itself, and moreover that it is using the TCP protocol, then it outputs this IP packet to a transmission control unit 2, and requests it to perform processing related to that packet. It should be understood that, with relation to packets which have been received and which use a protocol other than TCP—for instance, UDP (User Datagram Protocol) or ICMP (Internet Control Message Protocol)—the sending and receiving unit 1 requests their processing to software which is appropriate for that purpose, not illustrated in the figures.

The transmission control unit 2 processes communication control, such as error control and flow control and the like, based upon TCP. In particular, if a data segment has been received by the sending and receiving unit 1, the transmission control unit 2 generates ACK (acknowledge response information) for notifying to the information server 24 that it has received that data segment. Furthermore, the transmission control unit 2 assigns resources such as memory and timers and so on for each TCP connection. It transfers the received data from the sending and receiving unit 1 to the functions or the unit of the upper layer protocols. It also transfers the data to send from this functions or the unit to the sending and receiving unit 1.

A reception interval measuring unit 3 (first detection unit) measures the time interval (reception interval or receiving interval) in which a data segment is received by the sending and receiving unit 1. This reception interval measuring unit 3 includes a timer which detects expiration at a first predetermined value. In this first embodiment, this first predetermined value is set to 500 ms. This value is made to be the same as the timeout value until the data link protocol of the wireless communication path gives up retransmission. This timer is reset by a command from the sending and receiving unit 1 when a data segment is transferred from the sending and receiving unit 1 to the transmission control unit 2. If the timer of the reception interval measuring unit 3 has expired, then the reception interval measuring unit 3, by setting an ACK reduction unit 4 activated, requires the ACK reduction unit 4 to reduce the number of ACKs, thus starting ACK reduction process.

If the start of ACK reduction process has been required by the reception interval measuring unit 3, then the ACK reduction unit 4 reduces the number of ACKs which are transmitted to the wireless terminal 21 via the sending and receiving unit 1. This ACK reduction unit 4 has a buffer 5. This buffer 5 temporarily stores the ACKs which have been input to the ACK reduction unit 4. If the ACK reduction unit 4 is performing ACK reduction process in the state in which the buffer 5 is empty, then, when an ACK is input from the transmission control unit 2 to the ACK reduction unit 4, the ACK reduction unit 4 temporarily stores this ACK in the buffer 5, and does not output it to the sending and receiving unit 1.

When in this state a further ACK is input, the ACK reduction unit 4 overwrites the new ACK into the buffer 5, and does not output it to the sending and receiving unit 1. When this is repeated, only one ACK—the newest one—comes to be stored in the buffer 5. Next, when the ACK reduction unit 4 is inactivated, this ACK is output to the sending and receiving unit 1, and is transmitted to the wireless terminal 21. In other words, only the most recent ACK, among ACKs which are generated in succession, comes to be transmitted.

An ACK interval measuring unit 6 (second detection unit) measures the time intervals at which ACKs are generated by the transmission control unit 2. This ACK interval measuring unit 6 has a timer, and this timer expires in a second predetermined value. In this first embodiment, this second predetermined value is set to 10 ms. With regards to this value, a value is just a size which enables to detect that the generation of burst-like ACKs has terminated, and which moreover is as small a value as possible. When an ACK has been generated, the transmission control unit 2 requires the ACK interval measuring unit 6 to reset the timer. Upon receipt of this command, the ACK interval measuring unit 6 resets the timer.

When the timer of the ACK interval measuring unit 6 expires, the ACK interval measuring unit 6 stops the ACK reduction unit 4 reducing ACKs. At this time, if an ACK is stored in the buffer 5, the ACK reduction unit 4 outputs this ACK within the buffer 5 to the sending and receiving unit 1, and the sending and receiving unit 1 transmits this ACK to the wireless terminal 21. If the ACK reduction unit 4 is stopping the ACK reduction action, then the ACK which has been input is not stored in the buffer 5, but is directly transferred to the sending and receiving unit 1 and is transmitted. It should be understood that the values of the first predetermined value and the second predetermined value are not to be considered as being limited to the values disclosed above.

Next, the process of this data communication apparatus according to the first embodiment will be explained. In order to receive contents data and so on from the information server 24, first, the data communication apparatus 20 processes the establishment of a connection. The transmission control unit 2 creates a SYN (synchronize connection start request) packet, and transmits it to the wireless terminal 21 via the sending and receiving unit 1. This SYN packet is transmitted from the wireless terminal 21 to the wireless base station 22 by wireless communication, and is transmitted from the wireless base station 22 to the information server 24 via the internet 23. The information server 24 recognizes that this packet is a SYN packet on TCP, and creates a packet in which the ACK flag and the SYN flag within the TCP header are combined into one (SYN+ACK) packet, and transmits this packet to the data communication apparatus 20. This (SYN+ACK) packet is transmitted to the data communication apparatus 20, in the opposite direction to the SYN packet.

The establishment of a connection over TCP is known as a three-way handshake: the connection is established by the data communication apparatus 20 transmitting the SYN packet, and then, upon receipt thereof, the information server 24 transmitting the SYN+ACK packet, and then, upon receipt thereof, the data communication apparatus 20 transmitting an ACK. At this time, the SYN+ACK which has been received by the sending and receiving unit 1 is processed by the transmission control unit 2, and the ACK which has been generated by the transmission control unit 2 is transmitted to the information server 24 via the sending and receiving unit 1. At this time point, the ACK reduction unit 4 is not yet taking any action. When the ACK is received by the information server 24, the connection is established, and thereafter the information server 24 transmits a data segment to the data communication apparatus 20.

The subsequent operation of the data communication apparatus 3 follows the flowchart shown in FIGS. 3 through 7. In the following, the operation of the data communication apparatus 20 will be explained using FIGS. 3 through 7. The data communication apparatus 20 processes the procedures shown in FIG. 3 while receiving data segments from the wireless terminal 21. The sending and receiving unit 1 receives the data segment from the wireless terminal 21, and outputs this data segment to the transmission control unit 2 (in a step S31). The transmission control unit 2 assigns resources to the timers of the reception interval measuring unit 3 and the ACK interval measuring unit 6 for each TCP connection. Due to this, the transmission control unit 2 is able to process multiple connections at the same time. The transmission control unit 2 requires the reception interval measuring unit 3 to measure the first reception interval, and, upon receipt of this requirement, the reception interval measuring unit 3 starts its timer (in a step S32).

Figure 4:
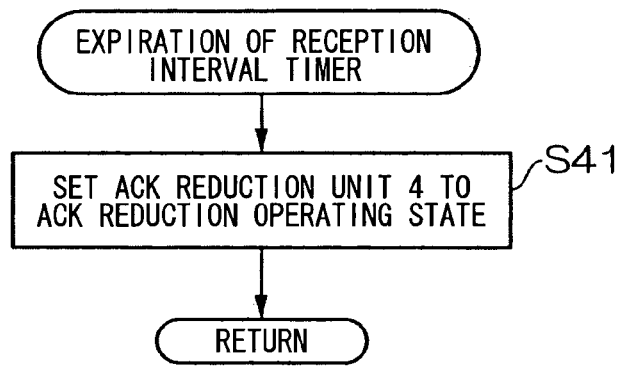
FIG. 4 is a flowchart showing the operation of this data communication apparatus, according to this first preferred embodiment, when a timer of a reception interval measuring unit has expired.

FIG. 4 shows the operation when the timer of the reception interval measuring unit 3 has expired.

If the timer of the reception interval measuring unit 3 has expired after 500 ms without being reset, then it is detected that the second time interval is greater than or equal to 500 ms, and the operation of FIG. 3 is suspended and the operation of FIG. 4 is executed, and after finishing processing the operation of this FIG. 4, the rest of the operation of FIG. 3 is restarted again. In FIG. 4, the reception interval measuring unit 3 starts the ACK reduction unit 4 reducing ACKs (in a step S41).

Figure 5:
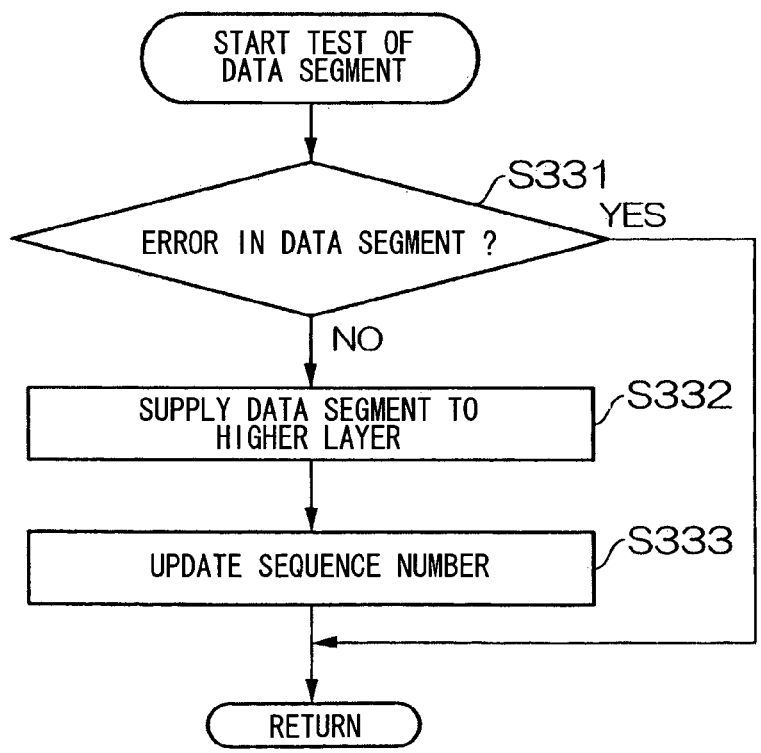
FIG. 5 is a flowchart showing the operation, according to this first preferred embodiment, when error testing this data communication apparatus.

Returning to FIG. 3, after the step S32, the transmission control unit 2 processes a test (a check) as to whether or not there is any error in the data segments which have been output from the sending and receiving unit 1 (in a step S33). This procedure is shown in FIG. 5. The transmission control unit 2 tests for errors in the data segments (in a step S331), and, if there are no errors, based upon TCP, links together the data segments in the order given by sequence numbers, and transfers the data to an application or the like which is waiting for the arrival of data (in a step S332). Next, the transmission control unit 2 updates the sequence number of the data segment which is kept internally (in a step S333), and terminates the procedures related to error testing. On the other hand, if in the step S331 there has been an error, the procedures related to error testing are terminated without updating the sequence number.

Figure 3:
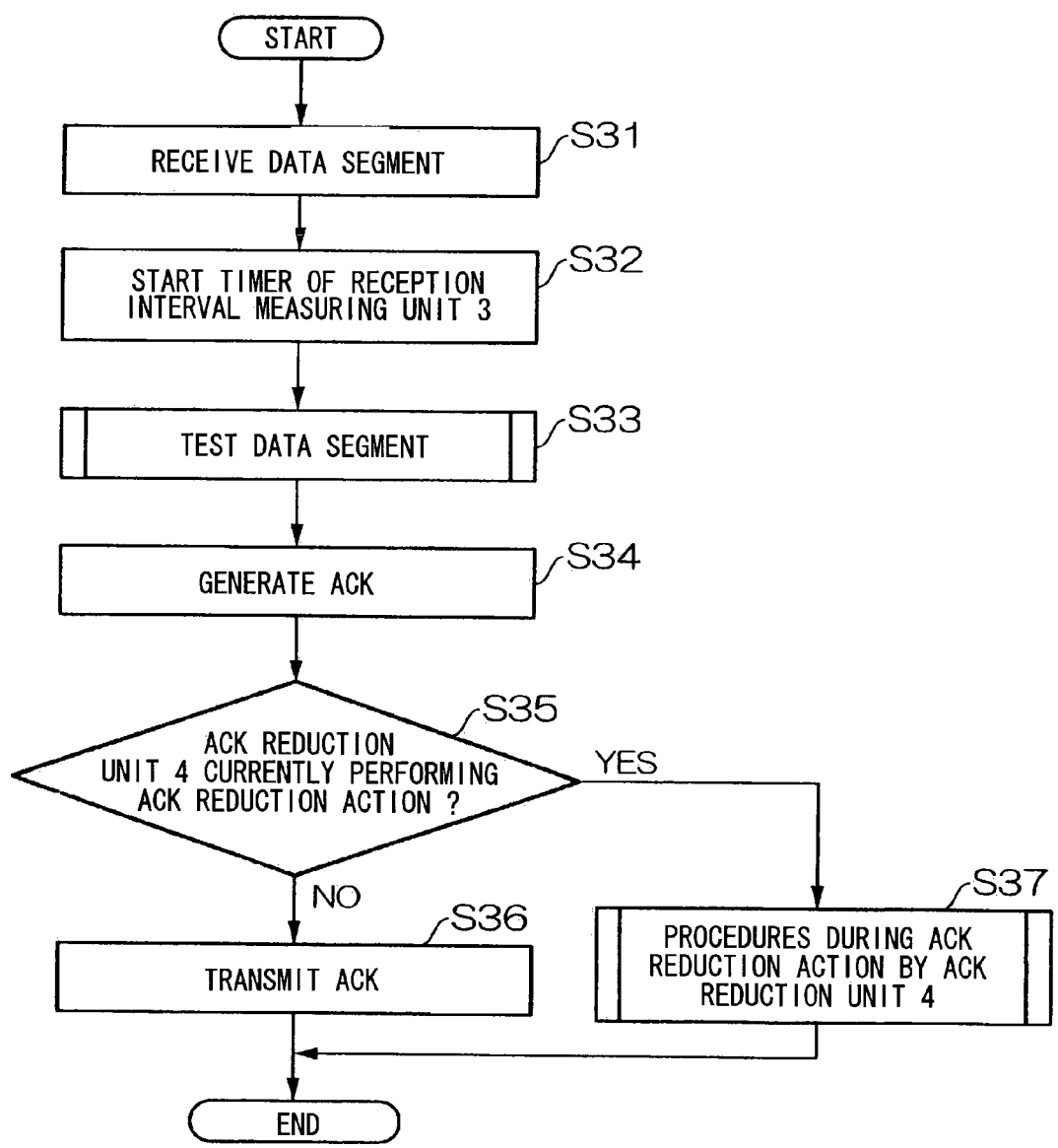
FIG. 3 is a flowchart showing the operation of this data communication apparatus according to this first preferred embodiment of the present invention.

Next, the flow of control proceeds to the step S34 of FIG. 3. The transmission control unit 2 generates an ACK which corresponds to the data segment which has arrived, and, along with outputting it to the ACK reduction unit 4, also requires the ACK interval measuring unit 6 to reset the timer. In this ACK, the sequence number of the data segment which is supposed to arrive after the data segment which has been checked is stored. Upon receipt of the requirement from the transmission control unit 2, the ACK interval measuring unit 6 resets its timer (in the step S34).

Next, the ACK reduction unit 4 judges whether or not ACK reduction operation is currently under way (in a step S35). Immediately after the TCP connection has been established, ACK reduction function of the ACK reduction unit 4 is not activated, therefore, the ACK reduction unit 4 outputs an ACK which has been input to the sending and receiving unit 1 directly. The sending and receiving unit 1 stores this ACK in an IP packet, and transmits it to the wireless terminal 21 (in a step S36). On the other hand, if in the step S35 it is determined that the ACK reduction unit 4 is processing ACK reduction operation, then the flow of control proceeds to the step S37.

Figure 6:
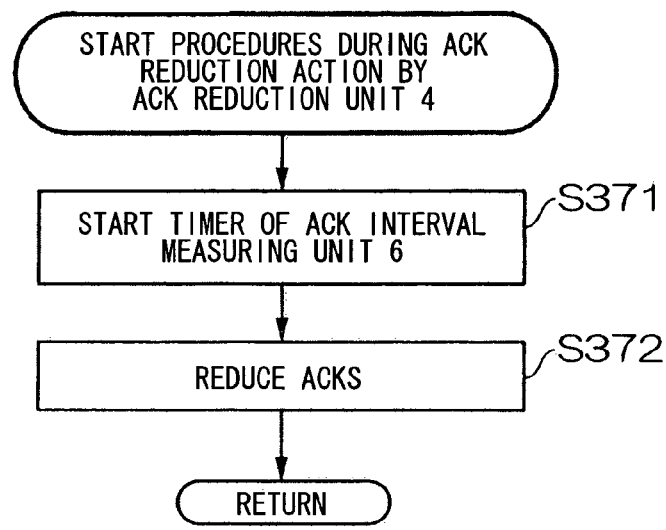
FIG. 6 is a flowchart showing the operation of this data communication apparatus, according to this first preferred embodiment, when an ACK reduction unit is performing ACK reduction operation.

The procedure of the step S37 is shown in FIG. 6. The transmission control unit 2 requires the ACK interval measuring unit 6 to measure the interval of generating ACKs, and, upon receipt of this command, the ACK interval measuring unit 6 starts its timer (in a step S371). Next, the ACK reduction unit 4 reduces the number of ACKs which have been input from the transmission control unit 2 (in a step S372).

In this process, if no ACK is stored in the buffer 5, the ACK reduction unit 4 temporarily stores the ACK which has been input in the buffer 5, and does not output it to the sending and receiving unit 1, but rather keeps it in the buffer 5. Furthermore, if an ACK is already stored in the buffer 5, then the ACK reduction unit 4 overwrites the new ACK into the buffer 5, and also does not send it to the sending and receiving unit 1, but rather keeps it in the buffer 5. By this operation, it is ensured that, always, only the single newest ACK is stored in the buffer 5. Next, when the ACK reduction unit 4 has stopped, this ACK is output to the sending and receiving unit 1, and is transmitted to the wireless terminal 21. In other words, among the ACKs which have been successively generated, only the newest one comes to be transmitted. After this, the process finishes.

Figure 7:
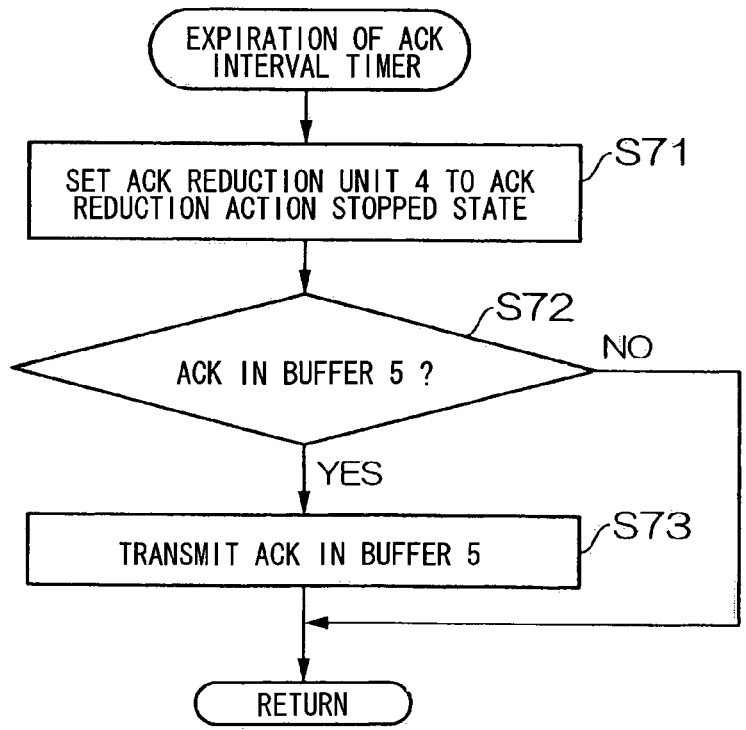
FIG. 7 is a flowchart showing the operation of this data communication apparatus, according to this first preferred embodiment, when the timer of the ACK interval measuring unit has expired.

FIG. 7 shows the operation when the timer of the ACK interval measuring unit 6 has expired. If the timer of the ACK interval measuring unit 6 has expired after 10 ms without being reset, then the operation of FIG. 3 or FIG. 5 is suspended, and the operations shown in FIG. 7 are executed, and, after the execution of these FIG. 7 operations has finished, the rest of the operation of FIG. 3 or FIG. 5 is restarted. If the timer of the ACK interval measuring unit 6 has expired, then the ACK interval measuring unit 6 stops the ACK reduction unit 4 reducing ACKs (in a step S71).

Next, the ACK reduction unit judges whether or not an ACK is stored in the buffer 5 (in a step S72). If an ACK is stored in the buffer 5, then the ACK reduction unit 4 outputs this ACK to the sending and receiving unit 1. And the sending and receiving unit 1 transmits this ACK to the wireless terminal 21 (in a step S73). On the other hand, if no ACK is stored in the buffer 5, then this process finishes.

In this first embodiment, ACKs which have been generated in a burst manner are, finally, reduced to a single ACK. At this time there is a possibility that, after about 500 ms interval, upon the transmission side, the ACK number (sequence number) which is notified by the ACK suddenly increases, and, due to this, a burst-like transmission occurs. Although there is a possibility that such burst-like transmission may cause congestion upon the forward link, a beneficial effect can be anticipated such that, if congestion is not occurred, deterioration of the throughput may be prevented by offsetting an interval of about 500 ms which has been previously generated. Since it often happens that the bottleneck in the forward link is the wireless channel, it becomes a problem such as whether or not congestion can be easily occurred at the forward link of the wireless channel.

Although this type of congestion rarely occurs at a wireless base station which employs a high speed wireless channel which nowadays is coming into widespread use, if congestion becomes a problem, it may also be acceptable to suppress the proportion of reduction of ACKs to a low level in the ACK reduction unit 4. In other words, the ACK reduction unit 4 counts the number of ACKs which are input with a counter, and if the number thereof reaches a predetermined constant threshold value, it clears the ACK which is stored in the buffer 5, and without, this time, storing the ACK which has been input in the buffer 5, transfers it to the sending and receiving unit 1, which transmits it. If the threshold value for the counter is M, then the transmission ratio of the ACKs which are transmitted to the wireless terminal 21, from among the ACKs which are generated by the transmission control unit 2, is 1/M. By transmitting the ACKs at a predetermined proportion, it is possible to prevent the burst nature on the transmission side.

It should be understood that although, in this description of the first embodiment, the ACK reduction unit 4 is disclosed which includes the buffer 5 for storing an ACK, this is not to be considered as being limitative of the present invention; it would also be possible to reduce the number of the ACKs without providing any such buffer 5. For example, it would be acceptable to arrange for the ACK reduction unit 4 to entirely throw away the ACKs which are input while it is performing ACK reduction process, and, by providing a counter, to output one ACK for every M ACKs which are input, therefore, by rejecting all the other ACKs, it is arranged to be able to reduce the number of the ACKs to 1/M of its original value.

Figure 8:
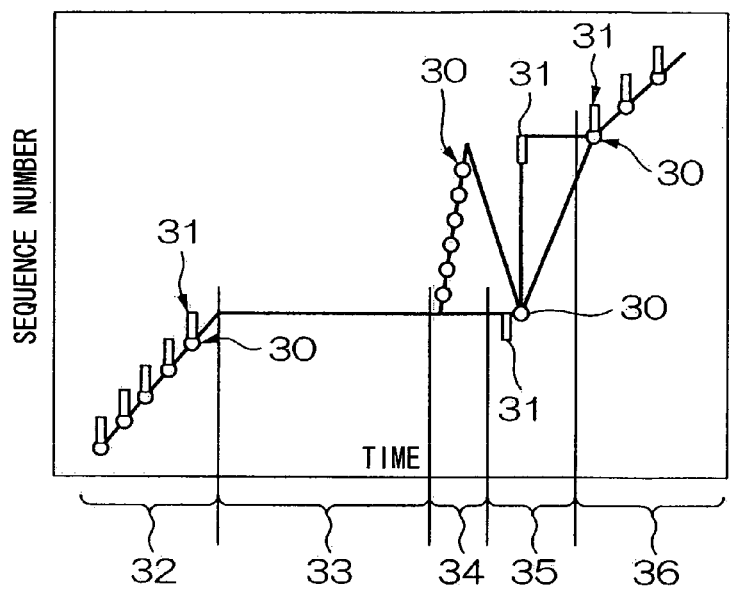
FIG. 8 is a time sequence graph showing a data reception situation with this first preferred embodiment of the present invention.

FIG. 8 is a time sequence graph showing the action of this first embodiment; in this figure, time is shown along the horizontal axis, while the sequence number is shown along the vertical axis. FIG. 8 shows the state of affairs upon the reception side. In the section 32, a data segment 30 arrives without any problems at the data communication apparatus 20, but a long delay takes place during the section 33. During this interval, the wireless terminal 21 waits for the data which it has requested to be retransmitted to be actually retransmitted, and during this interval data is also accumulated in succession in the wireless terminal 21. If the data for which an automatic repeat request (ARQ) has been sent is not actually retransmitted and a timeout expires in the wireless communication channel, then the wireless terminal 21 dispatches the data which it has accumulated.

Figure 12:
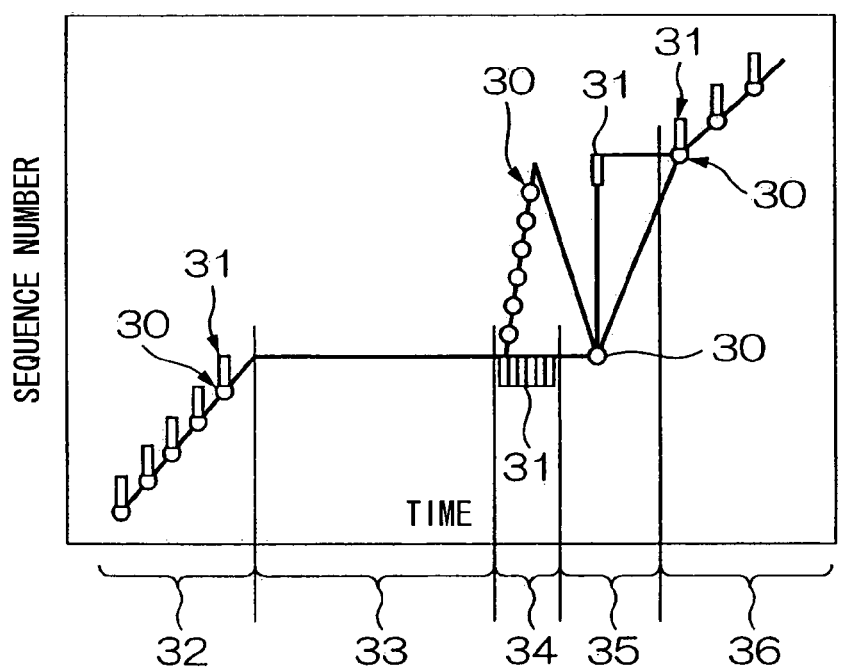
FIG. 12 is a time sequence graph showing a data reception situation with prior art type data communication.

Due to this, as shown in the section 34 of FIG. 8, a data segment 30 of large volume arrives at the data communication apparatus 20 in a short time period. However, one part of the data segment has not arrived. In the prior art, as shown in the section 34 of FIG. 12, a large volume of ACKs 31 was generated as a burst.

On the other hand, in this first embodiment, in the section 33, the timer of the reception interval measuring unit 3 expires in the first predetermined value, and ACK reduction process is started by the ACK reduction unit 4. And, in the section 34, data segments arrive in a shorter time interval than the second predetermined value until the timer of the ACK interval measuring unit 6 expires, and an ACK is generated by the transmission control unit 2 for these segments. Since, due to this, the ACK interval measuring unit 6 is reset before it has expired, the ACK reduction action by the ACK reduction unit 4 is continued, and no ACK is transmitted in the section 34.

And then, in the section 35, a single ACK 31 is transmitted. This is because the timer of the ACK interval measuring unit 6 expires due to the elapsing of 10 ms of time, the ACK reduction operation by the ACK reduction unit 4 is stopped, and the ACK which has been stored in the buffer 5 has been transmitted. The information server 24 performs retransmission of the data segment based upon TCP, and, in the section 35, it is shown that this has arrived at the data communication terminal 20. Since the ACK number of the ACK for the data segment which has been retransmitted is the sequence number of the data segment which ought to arrive next, accordingly the ACK number increases suddenly. After this, communication is satisfactorily recovered in the section 36.

The Second Embodiment

Figure 9:
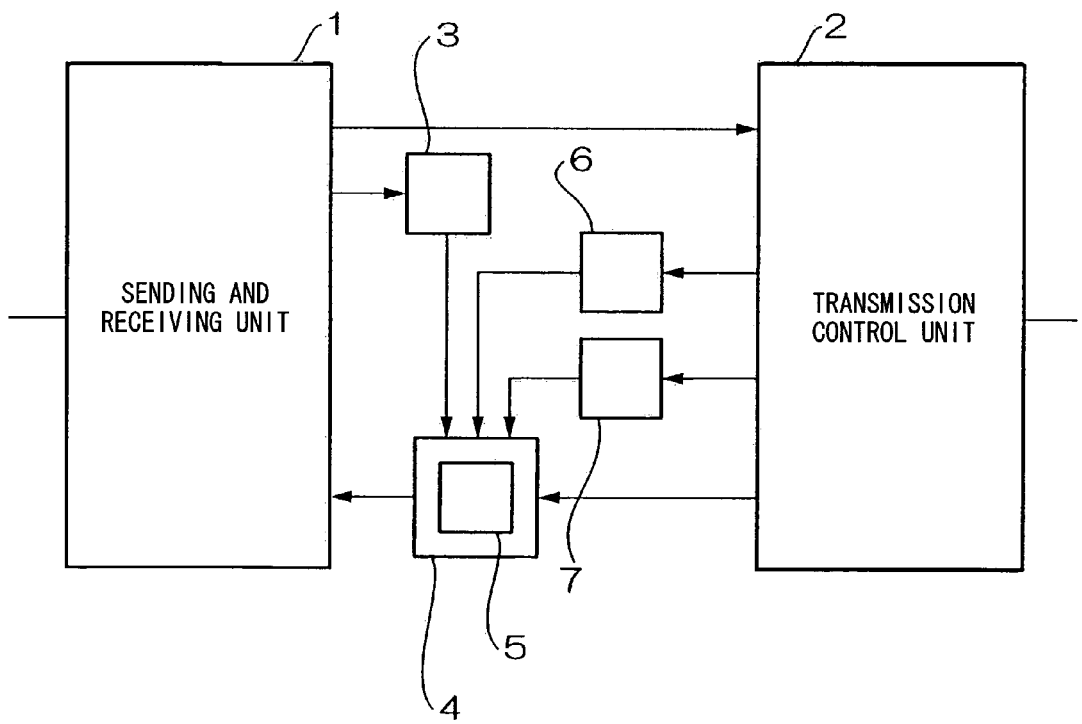
FIG. 9 is a block diagram showing the structure of a data communication apparatus according to the second preferred embodiment of the present invention.

Next, a second embodiment of the present invention will be explained. FIG. 9 is a block diagram showing the functional structure of a data communication apparatus according to this second embodiment. In this figure, to structures which are the same as ones shown in FIG. 2 the same reference symbols are appended, and the explanation thereof will be omitted. In this second embodiment, a duplicated ACK detection unit 7 (duplicate detection unit) is provided. This duplicated ACK detection unit 7 detects duplicate of the ACKs, based upon the ACK number, which is an identification number for the ACKs. Also, when a TCP connection has been started, resources are assigned to the duplicated ACK detection unit 7 by the transmission control unit 2

A duplicated ACK is an ACK for which the ACK number has been duplicated. On the reception side, in a case in which some data segment cannot be received and a subsequent data segment has been received, multiple ACKs are transmitted while keeping the ACK number fixed to the sequence number of the data segment which has been lost, and when the transmission side detects this, it processes the retransmission. This action is termed fast retransmit algorithm. If the transmission side has received three duplicate ACKs which have the same ACK number, then it executes such a fast retransmit algorithm. A duplicated ACK indicates that, even after a data segment has been lost, reception of the following data segments is continuing. Since, due to this duplicated ACK, it is considered that the congestion is insignificant, or that there is no congestion and that the loss has occurred due to an error or the like, the transmission side operates, based upon TCP, so as not to shrink the congestion window cwnd too much.

Figure 10:
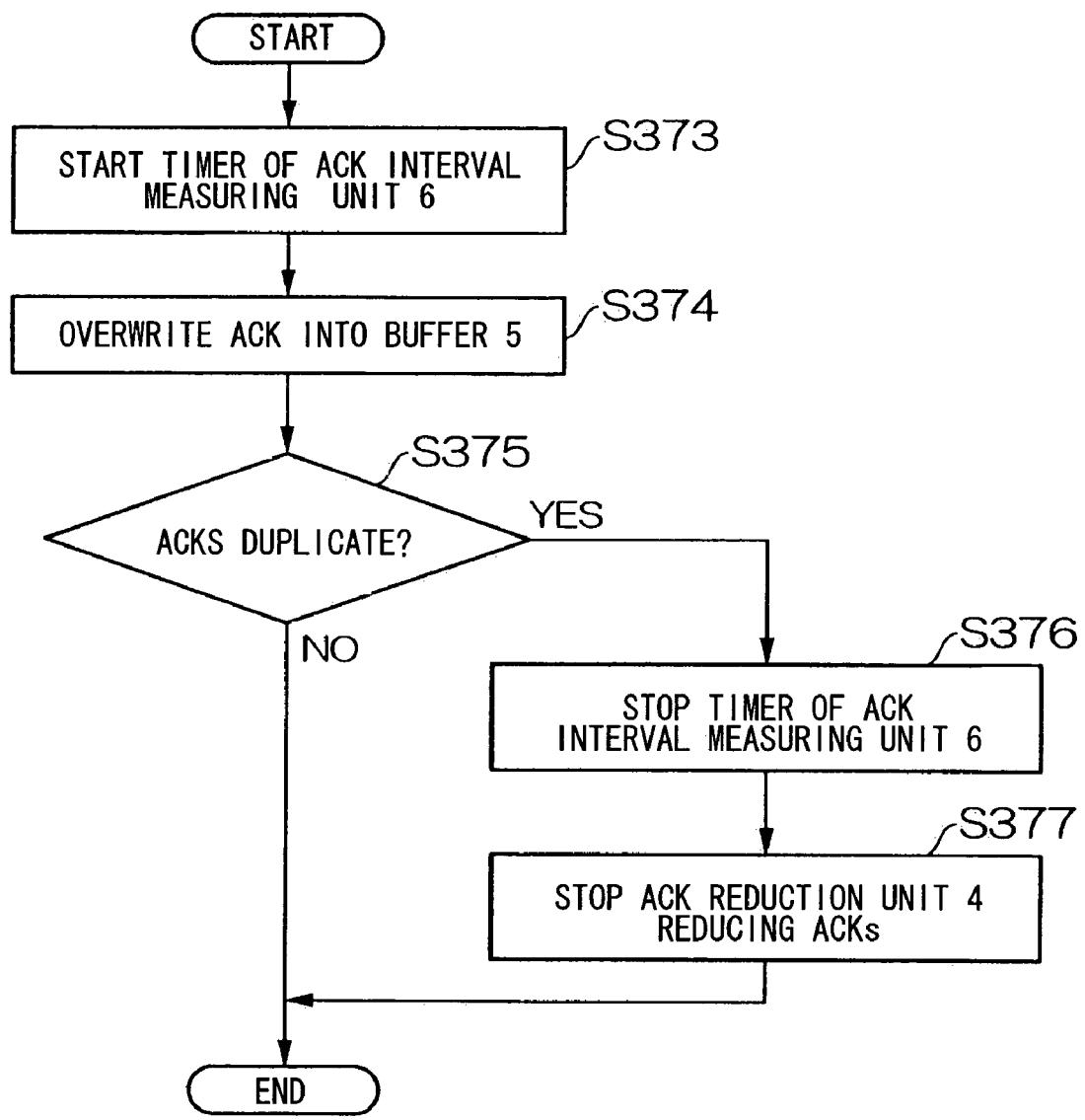
FIG. 10 is a flowchart showing the operation of this data communication apparatus, according to this second preferred embodiment, when an ACK reduction unit is performing ACK reduction operation.

Since such a duplicated ACK is very important for processing fast retransmission, in this second embodiment, losing a duplicated ACK due to the ACK reduction unit 4 is prevented by the duplicated ACK detection unit 7. The data communication apparatus according to this second embodiment processes the same operations as in the case of the first preferred embodiment, except that, as the operation in the step S37 of FIG. 3, the operations shown in FIG. 10 are processed. In the following, the action in the step S37 of FIG. 3 will be explained referring to FIG. 10.

The transmission control unit 2 requests the ACK interval measuring unit 6 to measure the ACK generation interval, and, upon receipt of this request, the ACK interval measuring unit 6 starts its timer (in a step S373). In relation to the ACK which has been output from the transmission control unit 2 in the step S34, if no ACK is stored in the buffer 5, the ACK reduction unit 4 stores this ACK in the buffer 5; while, if an ACK is stored in the buffer 5, it overwrites this ACK into the buffer 5 (in a step S374).

The transmission control unit 2 notifies the ACK number of the ACK which was generated in the step S34 of FIG. 3 to the duplicated ACK detection unit 7. The duplicated ACK detection unit 7, along with storing this ACK number which has been notified, also judges whether or not this ACK number is the same as the ACK number of the ACK which has been previously stored (in a step S375). If the ACK number which has been notified by the transmission control unit 2 is not the same as the ACK number of the ACK which has been previously stored, then the flow of control returns to FIG. 3, and processing finishes.

On the other hand, if the ACK number which has been notified by the transmission control unit 2 is the same as the ACK number of the ACK which has been previously stored, then the duplicated ACK detection unit 7 requires the ACK interval measuring unit 6 to stop its timer. Upon receipt of this request, the ACK interval measuring unit 6 stops the timer (in a step S376). The duplicated ACK detection unit 7 stops the ACK reduction process of the ACK reduction unit 4, and thus the ACK reduction process by the ACK reduction unit 4 goes into inactive status (in a step S377).

When the ACK reduction process by the ACK reduction unit 4 has been stopped, in the step S377, if an ACK is stored in the buffer 5, the ACK reduction unit 4 outputs this ACK to the sending and receiving unit 1, and, hereafter, the ACK reduction unit 4 outputs ACKs which are input to the ACK sending and receiving unit 1 just as they are. And the sending and receiving unit 1 transmits these ACKs to the wireless terminal 21. In other words, duplicated ACKs are not lost, but are transmitted. Since with duplicated ACKs the first three are meaningful, the fourth and subsequent duplicated ACK which is generated in a burst manner ought to be reduced. Accordingly, it is acceptable that the duplicated ACK detection unit 7 has a counter for counting the number of duplicated ACKs which have been detected, and when the fourth duplicated ACK has been detected, the duplicated ACK detection unit 7 requires the ACK reduction unit 4 to start ACK reduction process.

Figure 11:
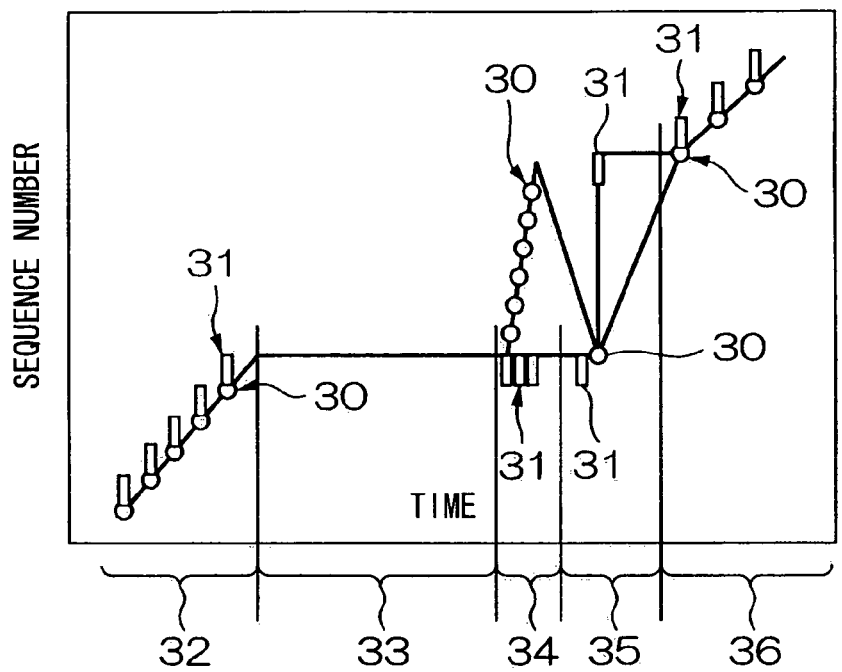
FIG. 11 is a time sequence graph showing a data reception situation with this second preferred embodiment of the present invention.

FIG. 11 is a time sequence graph showing the processing of this second embodiment; in this figure, time is shown along the horizontal axis, while the sequence number is shown along the vertical axis. In the same manner as in FIG. 8, FIG. 11 shows the situation upon the reception side. In FIG. 11, three ACKs 31 are transmitted in the section 34. These are duplicated ACKs in which the ACK numbers are constant and same, since a portion of the data segment 30 is missing.

The duplicated ACK detection unit 7 detects this fact, and the duplicated ACKs are transmitted by stopping the ACK reduction process of the ACK reduction unit 4.

Since the information server 24 performs a fast retransmission based upon TCP if there are three of these duplicated ACKs, accordingly, in order to reduce unnecessary duplicated ACKs, when the duplicated ACK detection unit 7 detects the fourth duplicated ACK, it activates the ACK reduction process by the ACK reduction unit 4, and thus avoids burst-like transmission of ACKs. By returning the duplicated ACK to the information server 24 and processing fast transmission, there is a possibility that the retransmission of the data segment in the section 35 of FIG. 11 may arrive more quickly than in the case of FIG. 8, so that this makes a contribution to increase throughput.

It should be understood that the data communication apparatus 20 and the wireless terminal 21 of the above described first or second embodiment may be made as a single unitary device, and this device may be connected according to standards such as USB or the like to a PC (Personal Computer) or a PDA (Personal Digital Assistant) or the like; or, these devices may be integrated internally to a PC or a PDA or the like.

Furthermore, the method of connection between the data communication deice 20 and the wireless terminal 21 is not limited to the one described in the above embodiments; for example, it would also be acceptable to connect them together via a serial interface such as USB or the like. Moreover, if the wireless terminal 21 is a data communication card, it may also be connected according to the PCMCIA standard. It should be understood that, for the data communication apparatus 20, for example, an information processing device such as a PC or a PDA or the like may be suggested, and, for the wireless terminal 21, for example, a portable telephone unit, a data communication apparatus, or a wireless communication device such as a communication module or the like may be suggested. Yet further, the data communication apparatus 20 and the wireless terminal 21 may be a single integrated data communication apparatus, and, as this data communication apparatus, for example, there may be suggested a portable telephone unit, a PDA, a PC with an internal wireless communication unit, or the like.

As described above, according to the first embodiment of the present invention, if a time interval while data is being received is greater than or equals to a predetermined value, then the generation of ACKs in a burst-like manner is prevented by the ACK reduction unit 4 performing its ACK reduction process, until the time interval at which ACKs are being generated becomes greater than or equals to a predetermined value, therefore, it is possible to reduce the communication load upon the reverse link. In other words, it is possible to avoid shortage of bandwidth upon the reverse link, and it is possible to avoid delay of packets upon the reverse link, and loss of packets due to congestion.

Furthermore since, according to the second embodiment of the present invention, if the duplicated ACK detection unit 7 has detected an duplicated ACK, then the necessary duplicated ACKs for fast transmission are transmitted by stopping the ACK reduction process of the ACK reduction unit 4, accordingly it is possible to ensure that the fast transmission is executed, and thus it is possible to increase the throughput. Furthermore, by starting the ACK reduction process by the ACK reduction unit 4 if the duplicated ACK detection unit 7 has detected a fourth or subsequent duplicated ACK, it is possible to prevent the generation of useless duplicated ACKs in a burst-like manner.

The Third Embodiment

Figure 13:
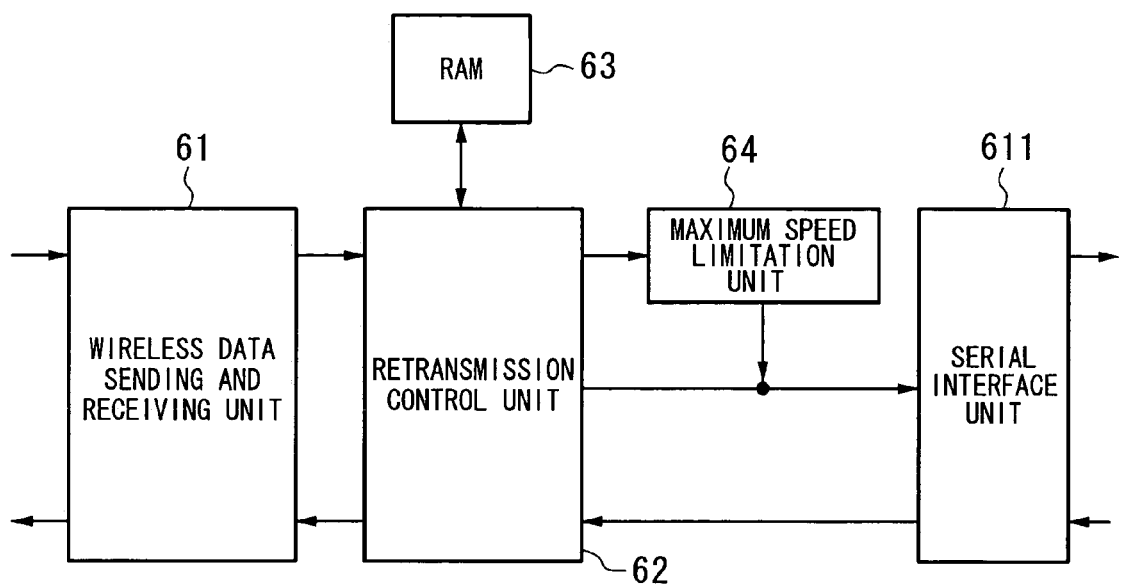
FIG. 13 is a block diagram showing the structure of a data communication apparatus according to the third preferred embodiment of the present invention.

FIG. 13 is a block diagram showing the structure of a data communication apparatus according to the third embodiment of the present invention. In this data communication apparatus, wireless communication is processed with a first device, which is a base station not shown in the figure, using a wireless data sending and receiving unit 61 and a retransmission control unit 62. In this communication, a TDMA (time division multiple access) technique is used upon the forward link (the reception side), and its transmission speed is a maximum of 2.4 Mbps and an average of 600 kbps. Furthermore, a CDMA (code division multiple access) technique is used upon the uplink (the transmission side), and its transmission speed is a maximum of 153.6 kbps. Yet further, in this data communication apparatus, as a data interface, input and output of data with other devices is performed with a serial interface unit 611 according to the USB (Universal Serial Bus) standard. This external device may be a personal computer or a bridge or a router or the like.

In the following, each of the construction elements in the figure will be explained. The wireless data sending and receiving unit 61 is a unit for sending and receiving, as electromagnetic energy, information signal sent and received upon a physical communication channel by modulating and demodulating it, and includes portions of the physical layer and the data link layer. This wireless data sending and receiving unit 61 receives electromagnetic waves from the base station and demodulates a signal which is modulated thereupon, and creates received data and outputs it to the retransmission control unit 62. Furthermore, the wireless data sending and receiving unit 61 modulates transmission data which has been output from the retransmission control unit 62, processes code division according to the CDMA technique, and transmits electromagnetic waves based upon this transmission data.

The data which is transmitted from the base station is divided into frames of small size, and an error detection code is appended to each frame. With relation to the data communication path, both of cable or wireless are acceptable, however, it is appropriate to apply the data communication apparatus of this embodiment to a communication channel in which the error rate is comparatively high, and in which, when an automatic repeat request (ARQ) is made, the time period until the retransmission is complete, or the time period until the transmission process expires and the transmission side gives up retransmission, is large. In this embodiment it is supposed that, as such a communication channel, a wireless communication channel which employs a cellular telephone or the like is utilized.

The retransmission control unit 62 performs error control and ARQ control and the like in relation to sending and reception of the data. A RAM 63 is a data storing unit which data can be written into and read form, for storing received data frames temporarily in which no error has occurred. And, in the following manner, the retransmission control unit 62 performs data communication at high reliability, according to an automatic repeat request protocol upon the data link layer.

If received data has been output from the wireless data sending and receiving unit 61, the retransmission control unit 62 tests for errors in the received data, and, if an error is detected, issues a request for retransmission of the data to the base station upon the transmission side.

Furthermore, if there is no error in the received data, according to the storage state of the data in the RAM 63, the retransmission control unit 62 either directly outputs the received data to the serial interface unit 611, or temporarily stores the received data in the RAM 63, reads the received data from the RAM 63 at a predetermined timing, and outputs it to a maximum rate limitation unit 64. Yet further, if transmitted data has been input from the serial interface unit 611 to the retransmission control unit 62, the retransmission control unit 62 outputs the transmitted data to the wireless data sending and receiving unit 61.

The retransmission control unit 62 uses a queue for management of the data which is stored in the RAM 63. If the received data has been stored in the RAM 63, the retransmission control unit 62 enqueues information of the received data to the queue, while, if received data has been read from the RAM 63 and has been output to the maximum rate limitation unit 64, it dequeues the information of the received data from the queue.

The maximum rate limitation unit 64 provides limitation so that the output speed of a data frame which is being output from the retransmission control unit 62 to the serial interface unit 611 does not exceed a maximum value which is set in advance.

This maximum rate limitation unit 64 is a type of scheduler, and includes a timer which can vary the interval according to the setting, and a FIFO (First In First Out) buffer which, according to timer events, outputs data frames to the serial interface unit 611.

The maximum rate can be increased by setting the timer interval shorter, and can be reduced by setting the timer interval longer. A value for the maximum value of the output speed set by the maximum rate limitation unit 64 is set when the power supply is turned on, or during reset operation, and is stored in a non-volatile memory not shown in the figure. The user is able to adjust the maximum value of the output speed which is set in the non-volatile memory, according to whether the communication path upon which this data communication apparatus is included is one upon which congestion can easily occur, or not. It should be understood that this maximum rate limitation unit 64 may also be an unit which, while performing output upon a fixed timer event, can vary the length of the data which is output for a single event.

The serial interface unit 611 is a communication unit according to the USB standard, and it performs input and output of data to and from a downstream device. This serial interface unit 611, along with outputting the received data which has been output from the retransmission control unit 62 or the maximum rate limitation unit 64 to the downstream device, also receives transmitted data which has been output from the downstream device, and outputs it to the retransmission control unit 62.

Next, the communication control action which is performed by the data communication apparatus of the above described construction elements will be explained. The wireless data sending and receiving unit 61 demodulates a signal which it has received from the base station, and creates received data and outputs it to the retransmission control unit 62. When no ARQ is generated, the retransmission control unit 62 detects whether or not there is any error in the received data, and, if there are no errors, and moreover no received data is stored in the RAM 63, outputs the received data to the serial interface unit 611. For a data frame which has been received, the header which is used in the wireless data link protocol is removed, and the data contents is output to the serial interface unit 611.

However, if there is an error in the received data, the retransmission control unit 62 generates ARQ message requesting to the transmission side for a transmission of the data, creates a data frame which stores the data to be transmitted and a header such as repeat request message and so on, appends an error detection code, and outputs it to the wireless data sending and receiving unit 61. And the wireless data sending and receiving unit 61 transmits this frame to the base station, after having performed processing upon it such as modulation and code division and the like. The retransmission control unit 62 tests for errors in the received data which it has received until the data frame which it has requested to be retransmitted is received, and stores this received data in the RAM 63 if there are no errors in it.

When the data frame which has been requested to be retransmitted is received by the wireless data sending and receiving unit 61 and is output to the retransmission control unit 62, then the retransmission control unit 62 tests for errors in this data frame.

If the data frame which has been requested to be retransmitted does not now contain any errors, then the retransmission control unit 62 compares together the sequence number of this data frame and the sequence numbers of the data frames which are stored in the RAM 63.

If the data frame which has been retransmitted is a preceding frame from the oldest data frame which is stored in the RAM 63, then the retransmission control unit 62 reads the data frames which is in a continuous order from the RAM 63, including the oldest frame, and outputs the retransmitted data frame and the data frames which have been thus read from the RAM 63 to the maximum rate limitation unit 64 in order of the data. Those among the data frames within the RAM 63 which have been output to the maximum rate limitation unit 64 are removed by the retransmission control unit 62. It should be understood that removing may be processed by actually removing the data itself and releasing the memory or, remaining the data itself and removing the entry information in the queue which is managed by said retransmission control unit 62.

If the data frame which has been retransmitted is not a preceding frame from the oldest data frame which is stored in the RAM 63, then the retransmission control unit 62 stores the data frame which has been retransmitted in the RAM 63. At this time, the retransmission control unit 62 processes management with the queue, so as to be able to output the data frames in the order of the data, rather than in the order in which the data was received. This management may, for example, be implemented using a linear list, with which a cell which indicates data which is newly stored is inserted in a position according to the order of the data in the linear list.

When the data frame which has been retransmitted has been output to the maximum rate limitation unit 64, this data frame is stored at the end of the FIFO buffer. The maximum rate limitation unit 64 processes a timer event which is occurred due to expiration every time a fixed time interval has passed which is set in advance, and, each time the timer event is processed, the data frame which is stored at the top of the FIFO buffer is output to the serial interface unit 611.

Figure 14:
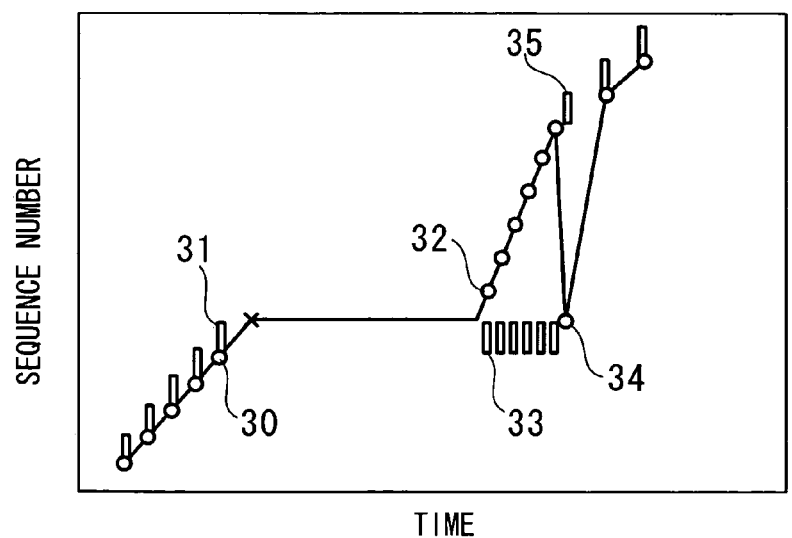
FIG. 14 is a time sequence graph showing a data reception situation during a delay spike, with this data communication apparatus according to the third preferred embodiment of the present invention.

FIG. 14 is a time sequence graph showing the situation during a delay spike when using this data communication apparatus according to this embodiment of the present invention. This figure shows the state of data reception upon the reception side based upon TCP, and, herein, time is shown along the horizontal axis, while the sequence numbers of the segments are shown along the vertical axis. In this figure, the round marks indicate data segments which have arrived at the device on the downstream side from this data communication apparatus, while the bar shaped quadrilaterals indicate the generation of ACKs which are transmitted to the transmission side, and the cross mark indicates a lost segment. Since this figure is one showing the situation on the reception side for TCP, the ACKs are transmitted almost simultaneously with the arrival of the data.

The ACK which corresponds to the segment 30 is the ACK 31. The communication prior to the segment 30 proceeded in a satisfactory manner, but the segment after the segment 30 is delayed due to the generation of a repeat request for the wireless communication path. When a timeout expires at the time point at which 500 ms has elapsed from the generation of the automatic repeat request (ARQ), the retransmission control unit 62 gives up receiving the requested data. The data which was received during the period until the expiration of the timeout, in which there were no errors, is stored temporarily in the RAM 63, and, after the timeout, is read by the retransmission control unit 62 and is output to the maximum rate limitation unit 64.

Since in FIG. 14 the timeout expires without processing any retransmission, one segment has been lost, and a delay spike is caused by the following segment 32 and the subsequent segments. However, with this data communication apparatus according to the present invention, it is ensured that the output rate for the data does not exceed a certain maximum value, because of the operation of the maximum rate limitation unit 64. Due to this, the segment 32 and the subsequent segments are received by the downstream device while maintaining appropriate time intervals between them, and moreover congestion does not occur. The ACK which corresponds to the segment 32 is the ACK 33, and the ACK is transmitted almost simultaneously with the arrival of the segment at the downstream device, so that the transmission interval for the ACKs is maintained.

Figure 17:
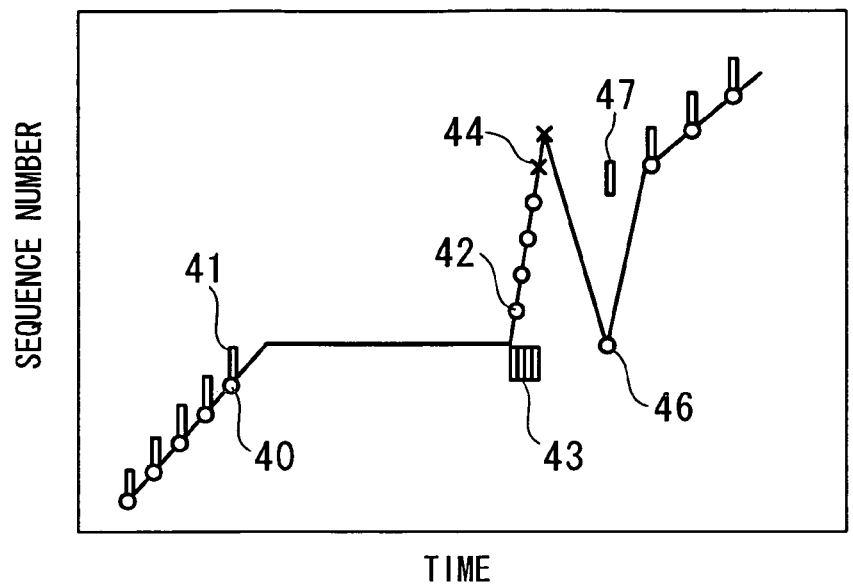
FIG. 17 is a time sequence graph showing a data reception situation during a delay spike (when congestion has occurred upon a forward link), with a data communication apparatus according to the prior art.
Figure 18:
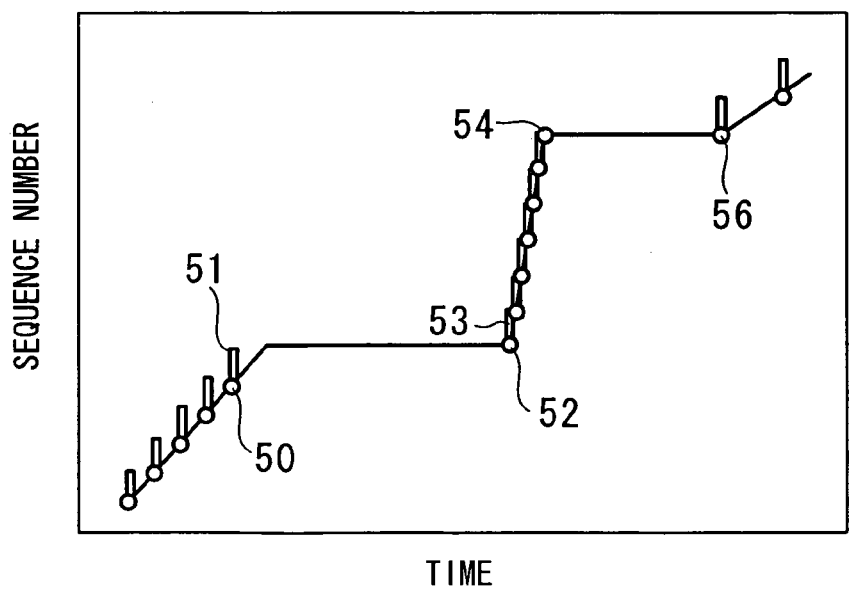
FIG. 18 is a time sequence graph showing a data reception situation during a delay spike (when congestion has occurred upon a reverse link), with a data communication apparatus according to the prior art.

On the transmission side, based upon TCP, the segment for which a retransmission timeout (RTO) has expired, or whose loss due to duplicated ACKs has been notified, is retransmitted. This segment which has been retransmitted is received as the segment 34. The ACK for this segment 34 is the ACK 35. After the ACK 35, the normal transmission mode is recovered. In the prior art, as shown in FIG. 17, congestion occurred in the downlink direction downstream of the data communication apparatus, so that a lost segment 44 occurred, but in FIG. 14 no segment loss occurs in the downlink direction downstream of the data communication apparatus, and it will be understood that thereby the throughput is enhanced, since no retransmission of any such segment needs to be processed.

As described above, in this embodiment, the maximum rate limitation unit 64 limits the output speed of the data frames which are output from the retransmission control unit 62 to the serial interface unit 611 less than or equal to the predetermined value (the maximum value). By doing this, even if a delay spike phenomenon has occurred, it is possible to suppress the occurrence of congestion, so that it is possible to avoid deterioration of the throughput.

The Fourth Embodiment

Figure 15:
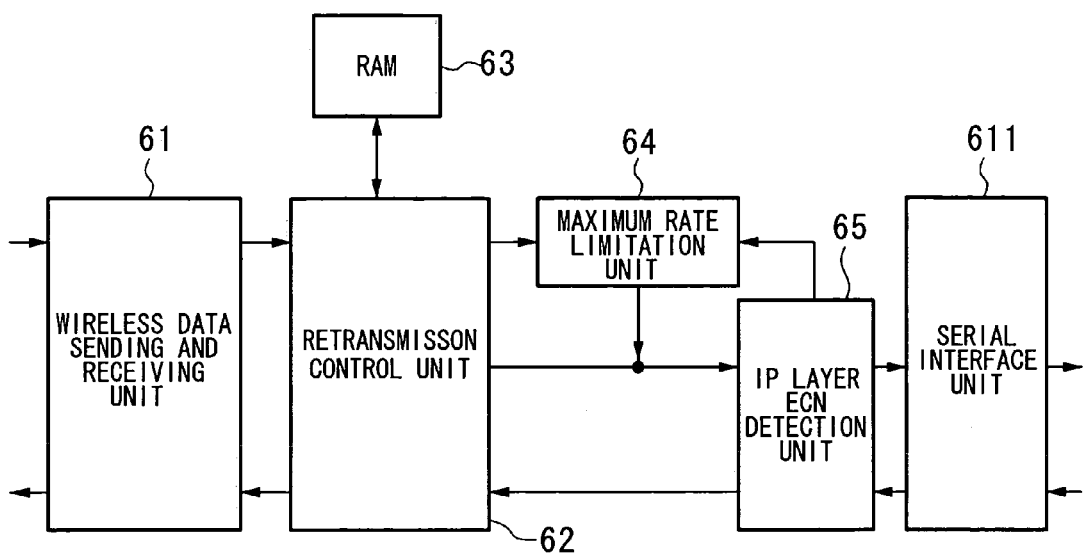
FIG. 15 is a block diagram showing the structure of a data communication apparatus according to the fourth preferred embodiment of the present invention.

Next, a fourth embodiment of the present invention will be explained. FIG. 15 is a block diagram showing the structure of a data communication apparatus according to this fourth embodiment. In this figure, to elements and structures which are the same as ones shown in FIG. 13, the same reference symbols are affixed, and the explanation thereof will be curtailed. An IP layer ECN detection unit 65 is provided to this FIG. 15 device. This IP layer ECN detection unit 65 is a unit which is used by a network layer protocol or by a superior layer protocol above the network layer, and which detects notification of congestion. For example, a flag for ECN (Explicit Congestion Notification) is provided (refer to RFC3168) in an IP (Internet Protocol) packet header or a TCP header, and, by looking at this flag, it is possible to detect whether or not presence of congestion is being notified.

The IP layer ECN detection unit 65 of the fifth embodiment recognizes the structure of IP packets, looks at the ECN flag bit which is present therein, and makes a decision as to whether or not this flag which indicates presence of congestion is set. And this IP layer ECN detection unit 65 performs ECN detection upon the received data which has been output directly, or via the maximum rate limitation unit 64, from the retransmission control unit 62, and outputs this received data to the serial interface unit 611. Furthermore, it performs ECN detection upon the transmission data which is output from the serial interface unit 611, and outputs this transmission data to the retransmission control unit 62. This detection is performed both in the forward link direction and in the reverse link direction.

However, it is also effective to perform this detection only for the reverse link. This is because, if there are many ECN flags, which indicate the occurrence of congestion due to a delay spike, this can be observed upon the reverse link. If an ECN flag which indicates the presence of congestion has been detected, the IP layer ECN detection unit 65 resets the maximum value for the data output rate which is set in the maximum rate limitation unit 64 to be smaller. By doing this, a maximum value of the data output rate for which congestion does not occur is automatically set in the maximum rate limitation unit 64, so that it is possible to suppress the occurrence of congestion.

The Fifth Embodiment

Figure 16:
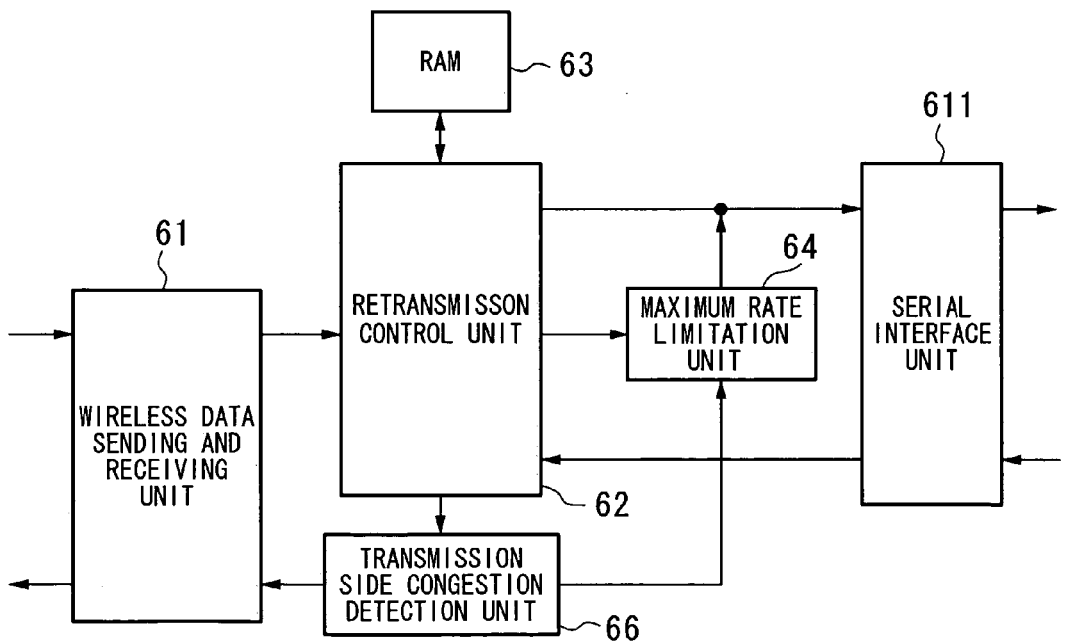
FIG. 16 is a block diagram showing the structure of a data communication apparatus according to the fifth preferred embodiment of the present invention.

Next, a fifth embodiment of the present invention will be explained. FIG. 16 is a block diagram showing the structure of a communication device according to this fifth embodiment. In this figure, to elements and structures which are the same as ones shown in FIG. 13, the same reference symbols are affixed, and the explanation thereof will be curtailed. In FIG. 16, a transmission side congestion detection unit 66 is provided. This transmission side congestion detection unit 66 is provided in the uplink direction between the retransmission control unit 62 and the wireless data sending and receiving unit 61, and receives data frames which have been output from the retransmission control unit 62 and output them to the wireless data sending and receiving unit 61. This transmission side congestion detection unit 66 is an unit which detects congestion during transmission upon the wireless communication path. And if transmission requests for data have been output from the retransmission control unit 62 in large volume while transmission of data in the reverse link direction is being delayed, then this transmission side congestion detection unit 66 detects that congestion has occurred.

The transmission side congestion detection unit 66 has a buffer and a queue using the buffer, and it detects the occurrence of congestion if it detects that the length of this queue has increased and exceeded a predetermined value. When this transmission side congestion detection unit 66 detects congestion, it resets the maximum value of the data output speed which is set in the maximum rate limitation unit 64 by decreasing it. By doing this, it is possible to set the maximum value of the data output speed in the maximum rate limitation unit 64 automatically so that congestion does not occur, and thereby it is possible to suppress the occurrence of congestion. It should be understood that it may also be detected that congestion is taking place, if the queue arrives at the storage amount limit for the buffer, and some data which should be transmitted by the transmission side congestion detection unit 66 is discarded.

It should be understood that the data communication apparatus according to the above embodiments of the present invention may be connected via a standard such as USB or the like to a PC (Personal Computer) or a PDA (Personal Digital Assistant) or the like; or, alternatively, these data communication apparatus may be housed internally to such a PC or PDA or the like.

Although embodiments of the present invention have been described in detail above with reference to the drawings, the concrete details of the structure of the present invention should not be considered as being limited to the details of those preferred embodiments; various design changes and so on are permissible, provided that the gist of the present invention is not departed from. For example, a program for implementing the action and the function of the data communication apparatus 20 of any of the above described preferred embodiments may be recorded upon a recording medium which can be read by a computer, and then the present invention may be implemented by reading this program recorded upon this recording medium into a computer and executing it.

Here by "computer", if the WWW system can be used, it is intended also to include a home page providing environment (or a display environment). Furthermore, by "recording medium which can be read by a computer", it is intended to mean a transportable medium such as a flexible disk, an opto-magnetic disk, a ROM, a CD-ROM, or the like, or a storage device which is provided internally to a computer, such as a hard disk or the like. Yet further, by "recording medium which can be read by a computer", it is intended also to include a device which, if the program has been transmitted via a network such as the internet or the like, or via a communication line such as a telephone line or the like, temporarily stores the program for a certain time, such as a volatile memory (RAM) internal to a computer system which constitutes a server or a client.

Furthermore, the above described program may be transmitted via a transmission medium, or by a transmission wave within a transmission medium, from a computer upon which this program is stored in a storage device or the like to another computer. In this case, the term "transmission medium" by which the program is transmitted is intended to include any medium which is endowed with the function of transmitting information, such as a network such as the internet or the like (a communication network), or a communication line such as a telephone line or the like (a communication line). Yet further, the above described program may be one for implementing only a portion of the above described functionality. Even further, it may be a so called differential file (a differential program) which can implement the above described functionality in combination with a program which is already recorded upon a computer.

While embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

According to the present invention, the beneficial effect is obtained that the generation of ACKs in a burst-like manner is prevented, so that it is possible to alleviate the load upon the reverse link.

Moreover, according to the present invention, the beneficial effect is obtained that, even if a delay spike phenomenon has occurred, it is possible to prevent the occurrence of congestion, and to avoid deterioration of the throughput.

What is claimed is:

1. A data communication apparatus, comprising:
   a sending and receiving unit which sends and receives data;
   a transmission control unit which generates acknowledge response information corresponding to data which has been received by the sending and receiving unit, and outputs the acknowledge response information via the sending and receiving unit;
   a first detection unit which detects a reception interval in the data which is received by the sending and receiving unit;
   a second detection unit which detects interval of generation of the acknowledge response information generated by the transmission control unit; and
   a reduction unit which, if the reception interval detected by the first detection unit exceeds a predetermined interval, reduces the acknowledge response information generated by the transmission control unit, until the interval which is detected by the second detection unit exceeds a predetermined interval.

2. A data communication apparatus according to claim 1, wherein, if the reception interval detected by the first detection unit exceeds the predetermined interval, the reduction unit reduces the acknowledge response information by storing only the latest acknowledge response information generated by the transmission control unit.

3. A data communication apparatus according to claim 1, further comprising:
   a duplicate detection unit which detects duplicate of identification information of the acknowledge response information generated by the transmission control unit; wherein,
   the reduction unit reduces the acknowledge response information after a predetermined number of duplicates which have been detected by the duplicate detection unit.

4. A data communication apparatus, comprising:
   a sending and receiving unit which performs data sending and reception;
   a repeat request unit which performs detection related to errors of data received by the sending and receiving unit, and which requests repeat of the data if it has detected an error;
   a storage unit which stores data in which there are no errors and which is received before receiving the data for which the repeat request has been made is received; and
   a control unit which outputs the data which is stored in the storage unit at a predetermined rate, if the data for which the repeat request has been made is not received within a predetermined time interval.

5. A data communication apparatus according to claim 4, further comprising:
   a congestion detection unit which detects congestion based upon data received by the sending and receiving unit; wherein,
   the control unit reduces the predetermined rate if the congestion detection unit has detected congestion.

6. A data communication apparatus according to claim 4, further comprising:
   a congestion detection unit which detects congestion based upon data sent by the sending and receiving unit; wherein,
   the control unit reduces the predetermined rate if the congestion detection unit has detected congestion.

* * * * *